United States Patent
Rajput et al.

(10) Patent No.: US 12,526,235 B2
(45) Date of Patent: Jan. 13, 2026

(54) METHODS, SYSTEMS, AND COMPUTER READABLE MEDIA FOR USING OPTIMIZED TOKEN BUCKET ALGORITHM FOR INGRESS MESSAGE RATE LIMITING ACROSS DISTRIBUTED PRODUCER NETWORK FUNCTION (NF) APPLICATIONS

(71) Applicant: Oracle International Corporation, Redwood Shores, CA (US)

(72) Inventors: Jay Rajput, Bangalore (IN); John Nirmal Mohan Raj, Bangalore (IN); Ashish Jyoti Sharma, New Delhi (IN); Vijit Gosain, New Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 492 days.

(21) Appl. No.: 18/105,719

(22) Filed: Feb. 3, 2023

(65) Prior Publication Data

US 2024/0264854 A1 Aug. 8, 2024

(51) Int. Cl.
*H04L 47/215* (2022.01)
*G06F 9/455* (2018.01)

(52) U.S. Cl.
CPC ........ *H04L 47/215* (2013.01); *G06F 9/45558* (2013.01); *G06F 2009/4557* (2013.01);
(Continued)

(58) Field of Classification Search
CPC ......... G06F 9/45558; G06F 2009/4557; G06F 2009/45587; G06F 2009/45595; H04L 47/215
(Continued)

(56) References Cited

U.S. PATENT DOCUMENTS 5,381,413 A 1/1995 Tobagi et al.
6,748,435 B1 6/2004 Wang et al.
(Continued)

FOREIGN PATENT DOCUMENTS

CN 107209694 A 9/2017
CN 109788078 A 5/2019
(Continued)

OTHER PUBLICATIONS

3rd Generation Partnership Project; Technical Specification Group Core Network and Terminals; 5G System; Network Function Repository Services; Stage 3 (Release 18) 3GPP TS 29.510 V18.1.0 (Dec. 2022).

(Continued)

*Primary Examiner* — Jacob D Dascomb
(74) *Attorney, Agent, or Firm* — Jenkins, Taylor & Hunt, P.A.

(57) ABSTRACT

A method for using an optimized token bucket algorithm for ingress message rate limiting across distributed producer network function (NF) applications includes implementing a producer NF instance as distributed producer NF applications and implementing distributed ingress gateways (IGWs) for performing ingress message rate limiting for the distributed producer NF applications. The method further includes maintaining, for each of the distributed IGWs, a local token bucket for rate limiting of ingress service-based interface (SBI) request messages received by each of the distributed IGWs and maintaining a distributed token bucket for refilling the local token buckets. The method further includes receiving ingress SBI request messages at the distributed IGWs and consuming, by the distributed IGWs, tokens from the local token buckets to allow processing of the ingress SBI request messages by the distributed producer NF applications and refilling the local token buckets with (Continued)

tokens from the distributed token bucket when numbers of tokens in the local token bucket fall below a threshold level.

20 Claims, 9 Drawing Sheets

(52) U.S. Cl.
CPC .............. *G06F 2009/45587* (2013.01); *G06F 2009/45595* (2013.01)

(58) Field of Classification Search
USPC ............................................................ 718/1
See application file for complete search history.

(56) References Cited

U.S. PATENT DOCUMENTS

| | | | |
|---|---|---|---|
| 7,782,776 | B2 | 8/2010 | Shankar et al. |
| 8,190,593 | B1 | 5/2012 | Dean |
| 8,645,565 | B2 | 2/2014 | Sparks et al. |
| 8,879,431 | B2 | 11/2014 | Ridel et al. |
| 10,237,875 | B1 | 3/2019 | Romanov |
| 10,819,636 | B1 * | 10/2020 | Goel ........................ H04L 47/20 |
| 10,880,370 | B2 | 12/2020 | Seenappa et al. |
| 11,159,359 | B2 | 10/2021 | Goel |
| 11,616,725 | B1 * | 3/2023 | Syed ...................... H04L 47/782 |
| | | | 370/235 |
| 2003/0174649 | A1 | 9/2003 | Shankar et al. |
| 2003/0223414 | A1 | 12/2003 | Wong |
| 2004/0003069 | A1 | 1/2004 | Wong |
| 2004/0141473 | A1 | 7/2004 | Buot |
| 2004/0208183 | A1 | 10/2004 | Balachandran et al. |
| 2007/0242738 | A1 | 10/2007 | Park et al. |
| 2009/0055835 | A1 | 2/2009 | Zhu |
| 2009/0222584 | A1 | 9/2009 | Josefsberg et al. |
| 2011/0202604 | A1 | 8/2011 | Craig et al. |
| 2013/0272123 | A1 | 10/2013 | Lee et al. |
| 2014/0040975 | A1 | 2/2014 | Raleigh |
| 2015/0071074 | A1 | 3/2015 | Zaidi et al. |
| 2016/0234119 | A1 | 8/2016 | Zaidi et al. |
| 2018/0083882 | A1 | 3/2018 | Krishan et al. |
| 2018/0183724 | A1 | 6/2018 | Callard et al. |
| 2018/0262625 | A1 | 9/2018 | McCarley et al. |
| 2019/0268270 | A1 | 8/2019 | Fattah |
| 2020/0177629 | A1 | 6/2020 | Hooda et al. |
| 2020/0412597 | A1 | 12/2020 | Goel et al. |
| 2023/0006889 | A1 * | 1/2023 | Thyagaturu ......... H04L 41/5054 |

FOREIGN PATENT DOCUMENTS

| | | | |
|---|---|---|---|
| EP | 2575303 | A1 | 4/2013 |
| JP | 2005-244417 | A | 9/2005 |
| JP | 7589170 | | 11/2024 |
| WO | WO 2016/198104 | A1 | 12/2016 |
| WO | WO 2017/143915 | A1 | 8/2017 |
| WO | WO 2018/013925 | A1 | 1/2018 |
| WO | WO 2019/001376 | A1 | 1/2019 |

OTHER PUBLICATIONS

Token Bucket, https:/en.wikipedia.org/wiki/Token_bucket, Dec. 8, 2022.
Notification of Transmittal of the International Search Report and the Written Opinion of the International Searching Authority, or the Declaration for International Patent Application Serial No. PCT/US2024/013559 (May 28, 2024).
Office Action for Japanese Patent Application Serial No. 2021564209 (Jun. 21, 2024).
Notice to Grant for Japanese Patent Application No. 2021564209 (Oct. 15, 2024).
First Office Action for CN Application No. 202080023004.5 dated Jul. 4, 2022.
First Examination Report for IN Application No. 202147036462 dated Dec. 29, 2022.
Notice of Allowance and Fee(s) Due for U.S. Appl. No. 16/697,021 (Jun. 21, 2021).
Advisory Action for U.S. Appl. No. 16/697,021 (May 7, 2021).
Final Office Action for U.S. Appl. No. 16/697,021 (Feb. 2, 2021).
Applicant-Initiated Interview Summary for U.S. Appl. No. 16/697,021 (Jan. 26, 2021).
Non-Final Office Action for U.S. Appl. No. 16/697,021 (Sep. 29, 2020).
Notice of Allowance and Fee(s) Due and Examiner-Initiated Interview Summary for U.S. Appl. No. 16/453,955 (Aug. 26, 2020).
International Search Report and Written Opinion for PCT Application No. PCT/US2020/034723 dated Aug. 17, 2020.
"3rd Generation Partnership Project; Technical Specification Group Services and System Aspects; System Architecture for the 5G System; Stage 2 (Release 16)" 3GPP TS 23.501, V16.1.0 pp. 1-368 (Jun. 2019).
Office Action for European Patent Application Serial No. 20732441.9 (May 13, 2024).
Intent to Grant for European Patent Application Serial No. 20732441.9 (Aug. 19, 2025).

* cited by examiner

METHODS, SYSTEMS, AND COMPUTER READABLE MEDIA FOR USING OPTIMIZED TOKEN BUCKET ALGORITHM FOR INGRESS MESSAGE RATE LIMITING ACROSS DISTRIBUTED PRODUCER NETWORK FUNCTION (NF) APPLICATIONS

TECHNICAL FIELD

The subject matter described herein relates to ingress message rate limiting at a producer NF. More particularly, the subject matter described herein relates to methods, systems, and computer readable media for using an optimized token bucket algorithm for ingress message rate limiting across distributed producer NF applications.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint. "Distributed producer NF applications" as used herein, refers to producer NF applications implemented in separate pods, containers, or virtual machines that implement a producer NF instance.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G and other types of networks is that existing token bucket algorithms may be inefficient in performing ingress message rate limiting at distributed producer NF applications. For example, a producer NF instance may be implemented as a collection of distributed producer NF applications using different units or partitions of virtual resources, such as kubernetes pods, docker containers, or virtual machines. It may be desirable to perform ingress message rate limiting at each of the distributed producer NF applications to conserve producer NF resources. One mechanism for performing such ingress message rate limiting is to use a token bucket algorithm implemented with a distributed cache. When any of a plurality of distributed producer NF applications receives an ingress message, an ingress gateway associated with the producer NF application accesses the token bucket implemented in the distributed cache, determines whether the token bucket implemented in the distributed cache indicates sufficient capacity to allow processing of the message, and, if sufficient capacity exists, forwards the message to the associated producer NF application for processing and updates the cache. Accessing a distributed cache for each received message is inefficient and increases the latency in processing ingress messages.

In light of these and other difficulties, there exists a need for improved methods, systems, and computer readable media for ingress message rate limiting across distributed producer NF applications.

SUMMARY

A method for using an optimized token bucket algorithm for ingress message rate limiting across distributed producer network function (NF) applications includes implementing a producer NF instance as distributed producer NF applications and implementing distributed ingress gateways (IGWs) for performing ingress message rate limiting for the distributed producer NF applications. The method further includes maintaining, for each of the distributed IGWs, a local token bucket for rate limiting of ingress service-based interface (SBI) request messages received by each of the distributed IGWs and maintaining a distributed token bucket for refilling the local token buckets. The method further includes receiving ingress SBI request messages at the distributed IGWs and consuming, by the distributed IGWs, tokens from the local token buckets to allow processing of the ingress SBI request messages by the distributed producer NF applications and refilling the local token buckets with tokens from the distributed token bucket when numbers of tokens in the local token bucket fall below a threshold level.

According to another aspect of the subject matter described herein, implementing the producer NF instance as a plurality of distributed producer NF applications and implementing the distributed IGWs includes implementing the distributed producer NF applications and the distributed IGWs using separate virtualized computing resources.

According to another aspect of the subject matter described herein, implementing the distributed producer NF applications using the separate virtualized computing resources includes implementing the distributed producer NF applications using separate pods, docker containers, or virtual machines.

According to another aspect of the subject matter described herein, maintaining a local token bucket for each of the distributed IGWs includes initializing the local token bucket for each of the distributed IGWs with an amount of tokens based on historical ingress SBI request message traffic at the distributed IGW.

According to another aspect of the subject matter described herein, maintaining the distributed token bucket includes implementing the distributed token bucket using a distributed cache accessible by each of the distributed IGWs.

According to another aspect of the subject matter described herein, receiving the SBI request messages and consuming tokens from the local token buckets includes, at one of the distributed IGWs: receiving an ingress SBI request message; determining whether the local token bucket accessible by the one distributed IGW has sufficient tokens to allow processing of the ingress SBI request message; and in response to determining that the local token bucket has sufficient tokens to allow processing of the ingress SBI request message, consuming at least one token from the local token bucket and forwarding the ingress SBI request message to one of the distributed producer NF applications for processing the ingress SBI request message.

According to another aspect of the subject matter described herein, consuming at least one token from the local token bucket includes consuming the at least one token from the local token bucket without accessing the distributed token bucket.

According to another aspect of the subject matter described herein, refilling the local token buckets from the distributed token bucket comprises: in response to determining that the local token bucket does not have sufficient tokens to allow processing of the ingress SBI request message, communicating, to the distributed token bucket, a request for tokens for refilling the local token bucket; determining whether the distributed token bucket has sufficient tokens to satisfy the request; and in response to determining that the distributed token bucket has sufficient tokens to satisfy the request, refilling the local token bucket with tokens from the distributed token bucket.

According to another aspect of the subject matter described herein, consuming tokens from the local token buckets to allow processing of the ingress SBI request messages includes using the tokens in the local token bucket refilled from the distributed token bucket to allow processing of the ingress SBI request message received by the one distributed producer NF instance.

According to another aspect of the subject matter described herein, the method for ingress message rate limiting includes, in response to determining that the distributed token bucket does not have sufficient tokens to satisfy the request, discarding the SBI request message.

A system for using an optimized token bucket algorithm for ingress message rate limiting across distributed producer network function (NF) applications, is provided. The system includes a producer NF instance including at least one processor and a memory. The system further includes a plurality of distributed producer NF applications and a plurality of ingress gateways (IGWs) implemented using the at least one processor, each of the distributed IGWs each having access to one of a plurality of local token buckets for rate limiting of ingress service-based interface (SBI) request messages received by each of the distributed IGWs. The system further includes a distributed token bucket for refilling the local token buckets, and the distributed IGWs are configured to receive ingress SBI request messages, consume tokens from the local token buckets to allow processing of the ingress SBI request messages by the distributed producer NF applications, and refill the local token buckets with tokens from the distributed token bucket when numbers of tokens in the local token bucket falls below a threshold level.

According to another aspect of the subject matter described here, the producer NF includes a plurality of separate virtualized computing resources and the distributed producer NF applications and IGWs are implemented in the separate virtualized computing resources.

According to another aspect of the subject matter described here, the separate virtualized computing resources include separate pods, docker containers, or virtual machines.

According to another aspect of the subject matter described here, the local token bucket for each of the distributed IGWs is initialized with an amount of tokens based on historical ingress SBI request message traffic at the distributed producer NF instance.

According to another aspect of the subject matter described here, the producer NF instance includes a distributed cache accessible by each of the distributed IGWs and the distributed token bucket is implemented using the distributed cache.

According to another aspect of the subject matter described here, one of the distributed IGWs is configured to: receive an ingress SBI request message; determine whether the local token bucket accessible by the one distributed IGW has sufficient tokens to allow processing of the ingress SBI request message; and in response to determining that the local token bucket has sufficient tokens to allow processing of the ingress SBI request message, consume at least one token from the local token bucket and forward the ingress SBI request message to one of the distributed producer NF applications for processing.

According to another aspect of the subject matter described herein, the one distributed IGW is configured to consume the at least one token from the local token bucket without accessing the distributed token bucket.

According to another aspect of the subject matter described herein, the one distributed IGW is configured to refill the local token bucket from the distributed token bucket by: in response to determining that the local token bucket does not have sufficient tokens to allow processing of the ingress SBI request message, communicating, to the distributed token bucket, a request for tokens for refilling the local token bucket; determining whether the distributed token bucket has sufficient tokens to satisfy the request; and in response to determining that the distributed token bucket has sufficient tokens to satisfy the request, refilling the local token bucket with tokens from the distributed token bucket.

According to another aspect of the subject matter described herein, the one distributed IGW is configured to use the tokens in the local token bucket refilled from the distributed token bucket to allow processing of the ingress SBI request message received by the one distributed producer NF instance.

According to another aspect of the subject matter described herein, a non-transitory computer-readable medium having stored thereon executable instructions that when executed by a processor of a computer controls the computer to perform steps is provided. The steps include implementing a producer network function (NF) instance as a plurality of distributed producer NF applications. The steps further include implementing a plurality of distributed ingress gateways (IGWs) for performing ingress message rate limiting for the distributed producer NF applications. The steps further include maintaining, for each of the distributed IGWs, a local token bucket for rate limiting of ingress service-based interface (SBI) request messages received by each of the distributed IGWs. The steps further include maintaining a distributed token bucket for refilling the local token buckets. The steps further include receiving ingress SBI request messages at the distributed IGWs and consuming, by the distributed producer NF applications, tokens from the local token buckets to allow processing of the ingress SBI request messages by the distributed producer NF applications. The steps further include refilling each of the local token buckets with tokens from the distributed token bucket when numbers of tokens in the local token buckets fall below threshold levels.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
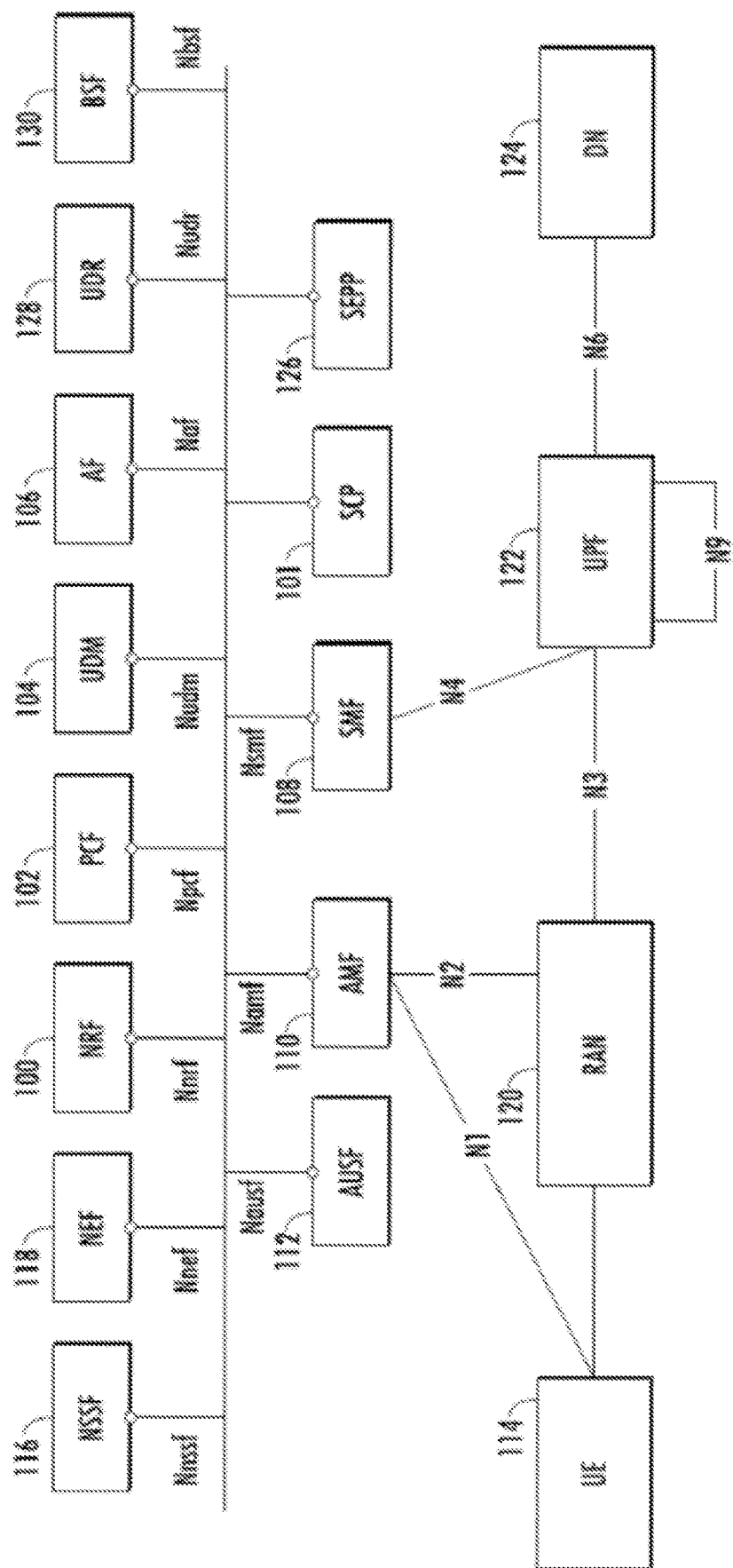
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As stated above, one problem that can occur in 5G and other types of networks is inefficiency in ingress message rate limiting across distributed producer NF applications. 5G NFs can process ingress request messages in a distributed fashion using Kubernetes cloud native environment pods. One implementation of a token bucket algorithm for request message rate limiting requires a distributed token bucket shared across pods using a distributed cache. Using a distributed cache alone, there is a need to consume tokens from the distributed token bucket shared using the distributed cache for every SBI request. This means that the distributed cache performs work for every request. Distributed cache processing requires extra resources (CPU, network bandwidth) and introduces latency in request processing. There is a need to optimize the resources needed by a distributed cache and reduce latency in ingress message processing or latency introduced by distributed cache processing. The subject matter described herein utilizes a local token bucket accessible by each of a plurality of ingress gateways associated with distributed producer NF applications and a distributed token bucket for refilling the local token buckets. Using the local token buckets to control the rate of message processing at the distributed producer NF applications reduces the number of token consumption requests to the distributed token bucket. Reducing the number of token consumption requests to the distributed token bucket reduces the resources needed for distributed cache processing and reduces latency introduced by the distributed cache.

In general, a token bucket algorithm allows processing of messages only if there are tokens in the bucket. The token bucket is filled at a configurable rate during token consumption or asynchronously in response to utilization. Tokens are removed from the bucket as messages are allowed to be processed by the entity whose resources are being regulated using the token bucket. Three configuration parameters are needed:
 bucket capacity;
 duration to decide how frequently to refill bucket; and
 tokens (number of) which should be added to refill the bucket.
Tokens/duration define the traffic rate. The bucket size can be defined as the capacity to handle a traffic burst.

Figure 2:
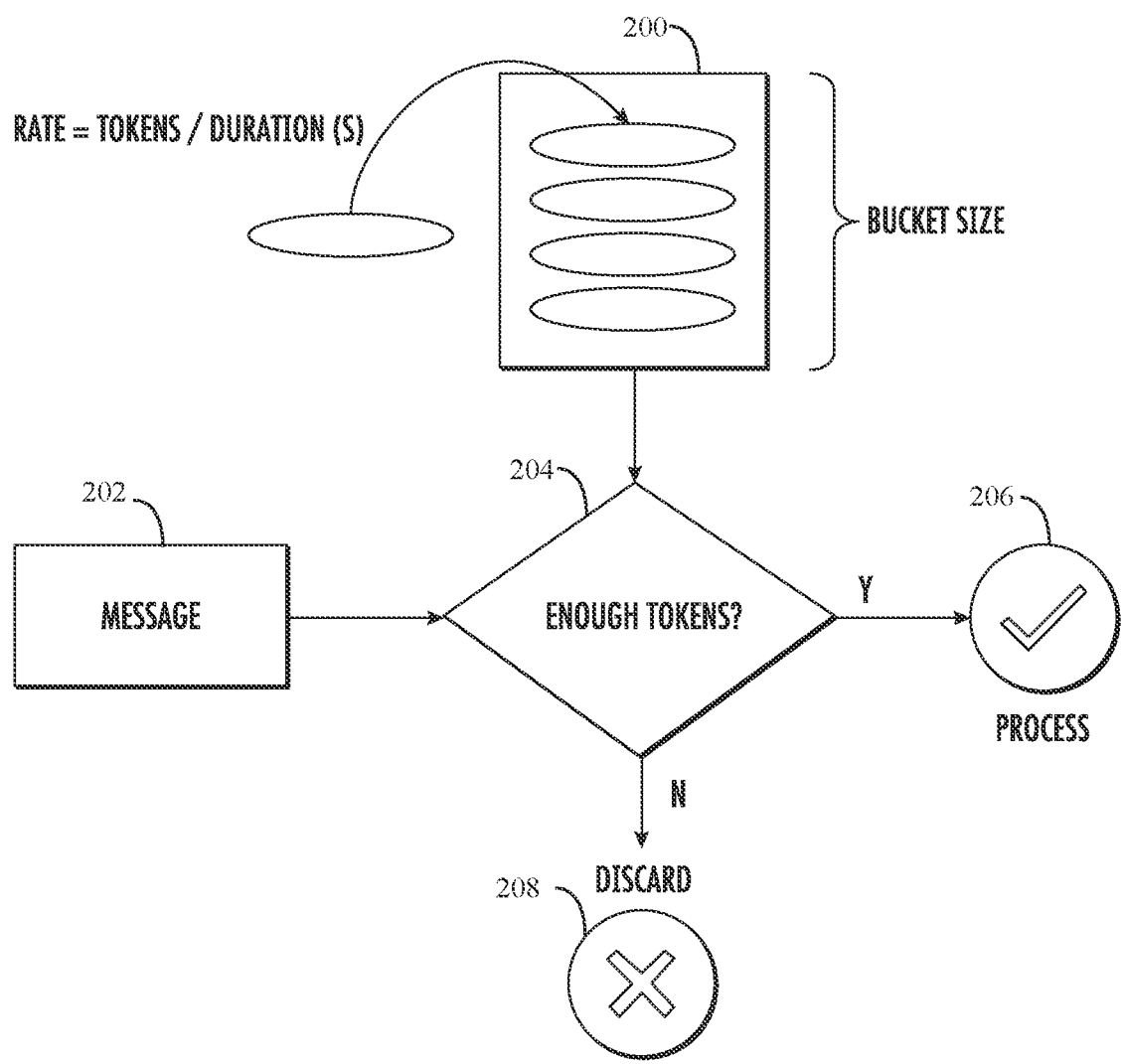
FIG. 2 is a flow chart illustrating a token bucket algorithm for message processing.

FIG. 2 is a flow chart illustrating a token bucket algorithm for controlling a rate of message processing. Referring to FIG. 2, a token bucket 200 includes a configured bucket size and a token refresh rate. When a message 202 arrives for processing, in step 204, it is determined whether token bucket 200 has sufficient tokens to allow processing of the message. If it is determined that token bucket 200 has sufficient tokens to allow processing of the message, control proceeds to step 206 where the message is processed, and one or more tokens are removed from token bucket 200. If it is determined that there are insufficient tokens in token bucket 200 to allow processing of the message, control proceeds to step 208 where the message is discarded.

A simple token bucket algorithm, such as that illustrated in FIG. 2, works well in a non-distributed environment. However, in a distributed environment, such an algorithm becomes inefficient as it requires access to a distributed cache each time a message arrives at any of the distributed processing elements that share the token bucket.

Ingress request message rate limiting is needed at 5G NFs to regulate access to 5G NF resources. Ingress request message rate limiting involves the task of counting the number of ingress SBI request messages that arrive at a 5G NF in a time period and determining whether the number exceeds a configured maximum number of messages allowed to be processed in the time period. The ingress request messages may be filtered and/or rate limited based on different criteria, such as URI, NF consumer ID, etc.

Figure 3:
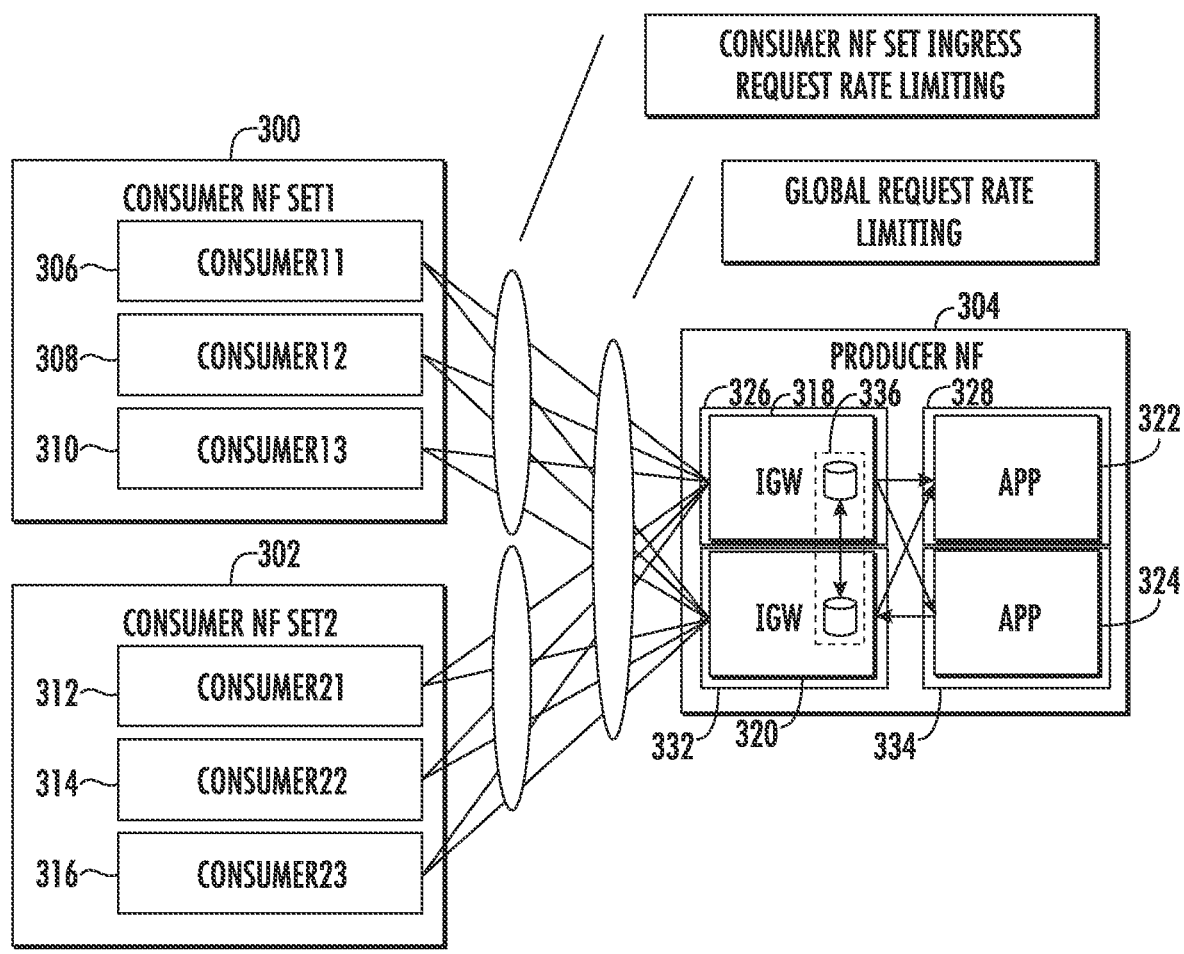
FIG. 3 is a network diagram illustrating ingress message rate limiting using a distributed token bucket.

FIG. 3 illustrates two different types of rate limiting at a producer NF—consumer NF set ingress request message rate limiting and global request message rate limiting. Both of these types of rate limiting rely on a distributed cache for counting the number of requests, which is resource intensive and introduces latency. Referring to FIG. 3, two different consumer NF sets 300 and 302 seek to send messages to a producer NF 304. Consumer NF set 300 includes consumer NF instances 306, 308, and 310. Consumer NF set 302 includes consumer NF instances 312, 314, and 316. Producer NF 304 includes distributed ingress gateways (IGWs) 318 and 320 and distributed producer NF applications 322 and 324 implemented in pods 326, 328, 330, and 334 Each distributed IGW 318 and 320 has access to distributed cache 336, which stores a distributed token bucket.

When producer NF 304 receives a message from one of consumer NF instances 306, 308, 310, 312, 314, and 316, producer NF 304 accesses distributed cache 336 to determine whether there are sufficient tokens to allow processing of the message in the token bucket implemented for the consumer NF set and in a separate global token bucket, both implemented using distributed cache 336. If there are sufficient tokens to allow processing of the message, the IGW that received the message forwards the message to the producer NF application 322 or 324 for processing. If there are insufficient tokens to allow processing of the message, the IGW that received the message will discard the message.

Because producer NF 304 is required to access distributed cache 336 for each received message, latency and processing ingress request messages is increased. It is desirable to reduce the number of accesses to distributed cache 336.

Counting of ingress request messages is needed for ingress request message rate limiting. In a distributed environment, a distributed cache is used to share the count of ingress request messages. Ingress request message rate limiting requires ingress request message counting across pods, which require usage of the distributed cache containing a distributed token bucket. The distributed token bucket needs to be accessed/updated to reserve/receive tokens for every ingress SBI request, which has resource usage and latency impacts. Updating the number of tokens in a token bucket is defined as token consumption as per the token bucket algorithm. There is a need to optimize resources and reduce latency by eliminating the need to consume tokens from the distributed bucket in the distributed cache for each received SBI request message.

Figure 4:
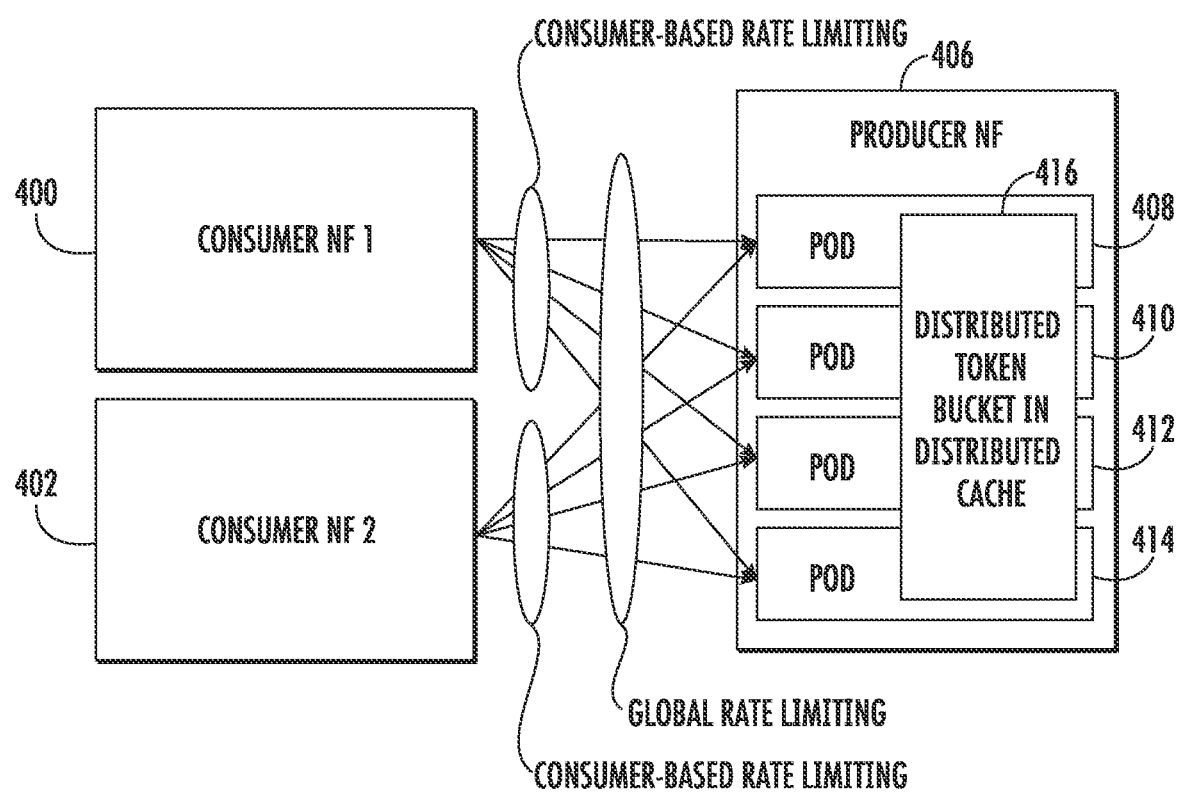
FIG. 4 is a network diagram illustrating ingress message rate limiting using a distributed token bucket implemented using a distributed cache.

FIG. 4 is a network diagram illustrating ingress message rate limiting using a distributed token bucket implemented using a distributed cache. Referring to FIG. 4, consumer NFs 400 and 402 are configured to send SBI request messages to producer NF 406. Producer NF 406 includes distributed producer NF applications and IGWs implemented using pods 408, 410, 412, and 414. In one example, the distributed producer NF applications and the IGWs are implemented in separate pods. In an alternate implementation, a single pod may be used to implement an IGW and a distributed producer NF application.

A distributed token bucket 416 is shared by the distributed IGWs implemented in pods 408, 410, 412, and 414. When an SBI request message arrives at producer NF 406, the IWG that receives the message accesses distributed token bucket 416 and determines whether there is a sufficient number of tokens to allow processing of the message. If distributed token bucket 416 contains a sufficient number of tokens, the token(s) are consumed, and the IGW forwards the message to its associated distributed producer NF application, which processes the message. If distributed token bucket 416 does not contain a sufficient number of tokens, the message is discarded. Requiring access to the distributed cache for each SBI request message received by a producer NF application is inefficient and increases message latency.

Figure 5:
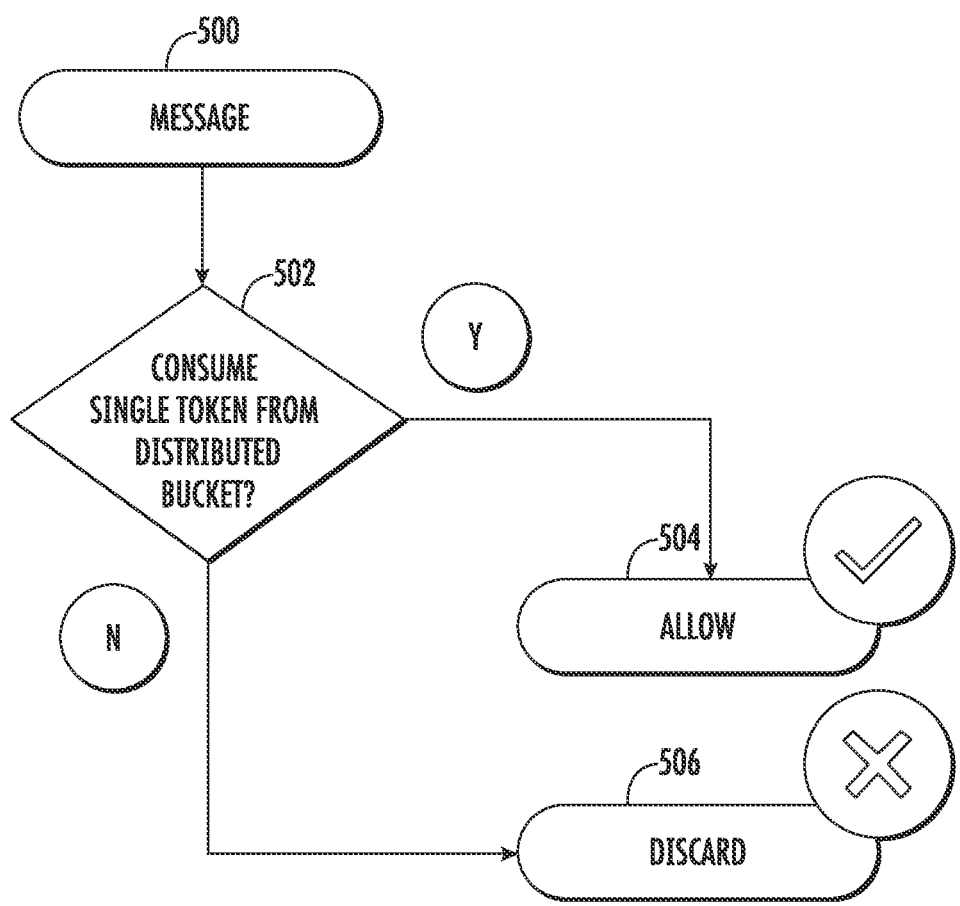
FIG. 5 is a flow chart illustrating a process for ingress message rate limiting using a distributed token bucket.

FIG. 5 is a flow chart illustrating a process for ingress message rate limiting using a distributed token bucket. Referring to FIG. 5, a message 500 is received at one of the pods sharing a distributed token bucket. In step 502, it is determined whether a token can be consumed from the distributed bucket. If a token can be consumed, control proceeds to step 504 where processing of the message is allowed. If a token cannot be consumed, control proceeds to step 506 where the message is discarded. Accessing the distributed token bucket requires access to the distributed cache, which impacts resource utilization and latency. There is a need to reduce resource utilization and latency.

The subject matter described herein includes a local token bucket associated with each of a plurality of distributed producer NF applications in addition to a distributed token bucket used to refill the local buckets and that is shared across the distributed IGWs. Each local token bucket is scoped to a pod, container, or VM, and access to a local bucket by an IGW does not require distributed cache processing. Ingress message rate limiting is achieved exclusively by consuming tokens from the local token bucket. When the local token bucket is empty or when the amount of tokens in the local token bucket falls below a threshold level, the IGW that has access to the local token bucket communicates a request to the distributed token bucket to refill the local token bucket with a predetermined number of tokens. Local token buckets are thus filled based on demand, rather than operator configuration. To reduce the number of accesses to the distributed token bucket, the request for refilling tokens from the distributed token bucket may request more than one token. The distributed token bucket is filled based on operator configuration. Local token bucket usage reduces the load on the distributed token bucket and the distributed cache. The size of the local token bucket may be determined based on the historical traffic patterns, such as the amount of traffic received by each local bucket during a configured time period. Local token bucket size may determine the number of tokens to request and consume from the distributed token bucket in each refill request.

Figure 6:
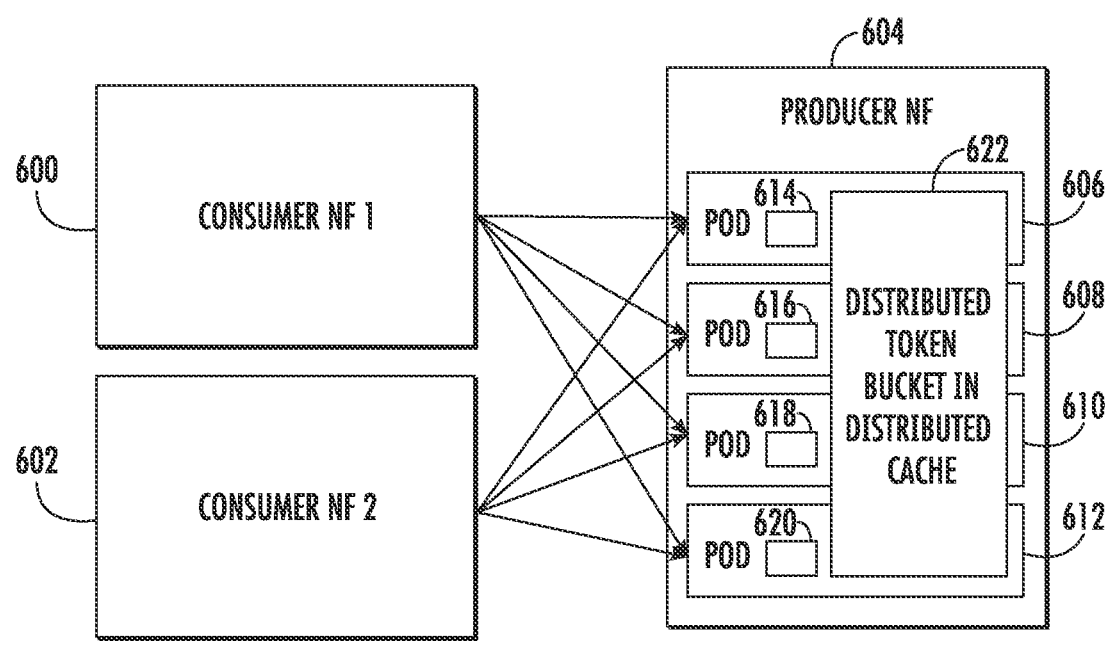
FIG. 6 is a network diagram illustrating ingress message rate limiting at a producer NF using an optimized token bucket algorithm that uses a local token bucket for each distributed producer NF application and a distributed token bucket for refilling the local token buckets.

FIG. 6 is a network diagram illustrating ingress message rate limiting at a producer NF using an optimized token bucket algorithm that uses a local token bucket for each distributed producer NF application and a distributed token bucket for refilling the local token buckets. Referring to FIG. 6, consumer NFs 600 and 602 may be configured to send messages to a producer NF 604. Producer NF 604 includes distributed producer NF applications implemented using pods 606, 608, 610, and 612. Each pod includes a local token bucket 614, 616, 618, and 620. Producer NF 604 further includes a distributed token bucket 622 shared across pods 606, 608, 610, and 612.

When a message arrives at producer NF 604, the IGW that received the message determines whether there are sufficient tokens in its local token bucket to allow processing of the message by its associated distributed producer NF application. If there are sufficient tokens in the local token bucket, the IGW forwards the message to the distributed producer NF application for processing and consumes one or more tokens from the local token bucket. If there are insufficient tokens in the local token bucket to allow processing of the message, the IGW that received the message may request refilling or replenishment of tokens from distributed token bucket 622. If distributed token bucket 622 includes sufficient tokens to satisfy the request from the IGW, distributed token bucket 622 provides the requested number of tokens to the IGW, and the tokens are stored in the local token bucket. The IGW then forwards the message to the producer NF application for processing and consumes one or more tokens from its local token bucket. If there are insufficient tokens in the distributed token bucket 622 for satisfying the request for refilling the local token bucket, the message received from the consumer NF is discarded.

Discarding messages received from consumer NFs when there are insufficient tokens to satisfy the amount of tokens required to allow processing of the messages achieves ingress message rate limiting at producer NFs. The amount of tokens required to allow processing of a request may be a configuration parameter set by the network operator. Using local token buckets in combination with a distributed token bucket decreases the frequency and number of accesses to the distributed token bucket over a rate limiting approach that uses a distributed token bucket alone. If the distributed token bucket is only accessed when the number of tokens in a local token bucket falls below an operator configured threshold, processing resources of the producer NF are further conserved, as accesses to the distributed token bucket only occur when necessary.

In one example, an IGW may request and receive a predetermined number of tokens from the distributed token bucket. The number of tokens to consume from the distributed token bucket may be based on previous traffic received by the IGW. The determination of how many tokens to consume from the distributed token bucket may be made in advance of the token consumption from the local token bucket. Consuming tokens from a local token bucket by an IGW is a local operation to the pod, container, or VM in which the IGW executes and does not require a call to the distributed cache that implements the distributed token bucket, thereby reducing the number and frequency of calls to the distributed cache.

Figure 7:
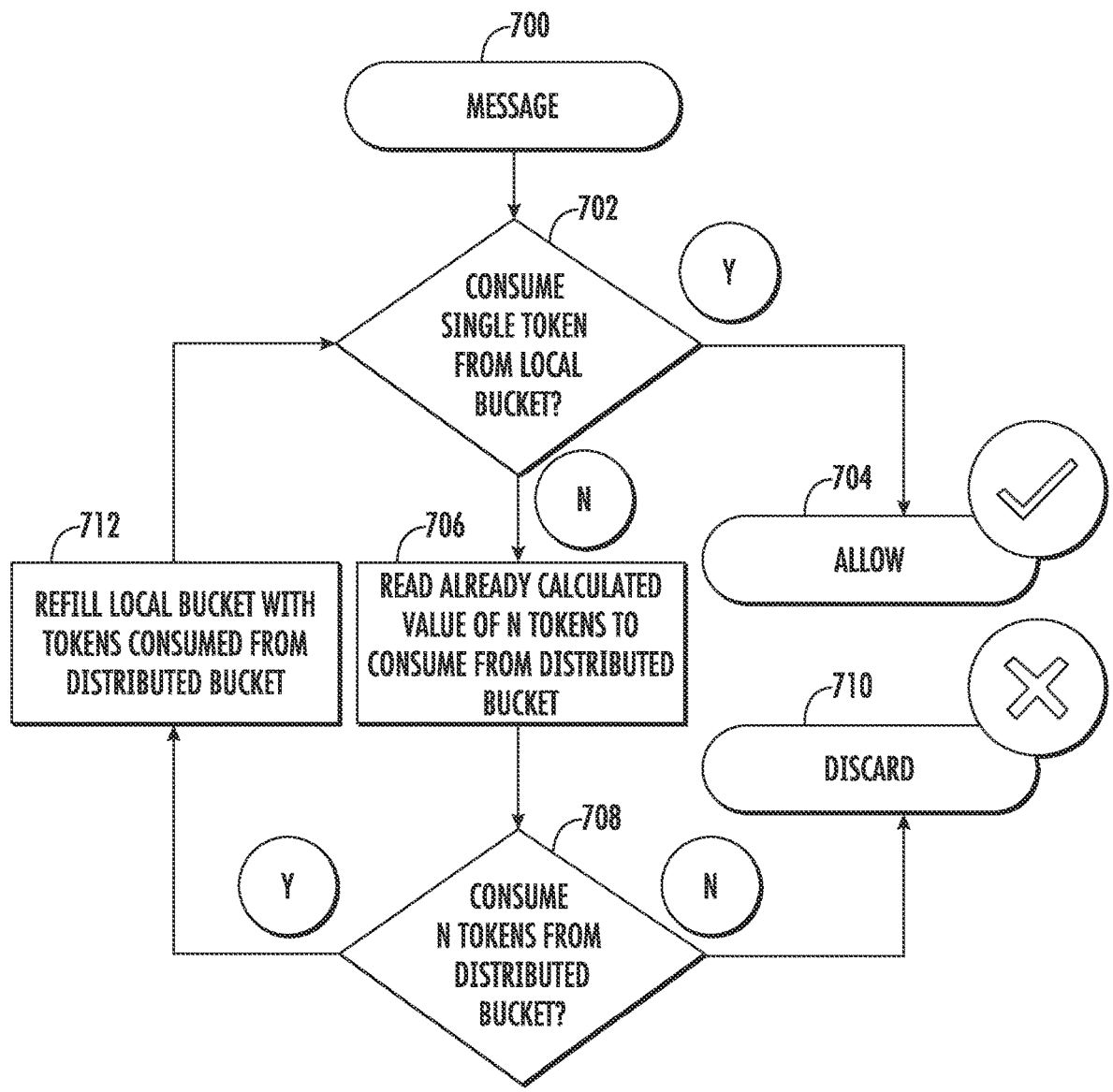
FIG. 7 is a flow chart illustrating a process performed by a producer NF application for using a local token bucket and a distributed token bucket to allow processing of a message received by the producer NF application.

FIG. 7 is a flow chart illustrating a process performed by an IGW for using a local token bucket and a distributed token bucket to allow processing of a message received by the IGW. Referring to FIG. 7, when a message 700 is received by a distributed IGW that implements the token bucket architecture illustrated in FIG. 6, the distributed IGW executes step 702 to determine whether a token is available in the local token bucket to allow processing the message. In this example a single token is consumed to allow processing of one SBI request message. However, any number of tokens can be used or consumed to allow processing of an SBI request message, depending on the amount of tokens available and the desired granularity of ingress message rate limiting. If the local token bucket has a token, control proceeds to step 704 where the token is consumed, and the IGW forwards the message to the associated producer NF application, which processes the message. The distributed token bucket is not accessed when there are sufficient tokens in the local token bucket to allow processing of a received SBI request message.

In step 702, if there are insufficient tokens in the local token bucket, control proceeds to step 706 where the IGW reads a value N (N being an integer set by the network operator) of tokens to request or consume from the distributed token bucket. Control then proceeds to step 708 where the IGW determines whether the distributed token bucket has the requested N tokens to be consumed. If the distributed token bucket does not have the requested N tokens, control proceeds to step 710 where the message is discarded.

If instead the distributed token bucket has the N tokens available, control proceeds to step 712 where the distributed IGW refills its local token bucket with the N tokens consumed from the distributed token bucket. The number of tokens in the distributed token bucket is decreased by the number N. Control then returns to step 702 where the distributed IGW determines whether to consume a single token from the local token bucket. Because the local token bucket was recently refilled, there are tokens available in the local token bucket to allow processing of the message, and control proceeds step 704 where processing of the message is allowed.

Figure 8:
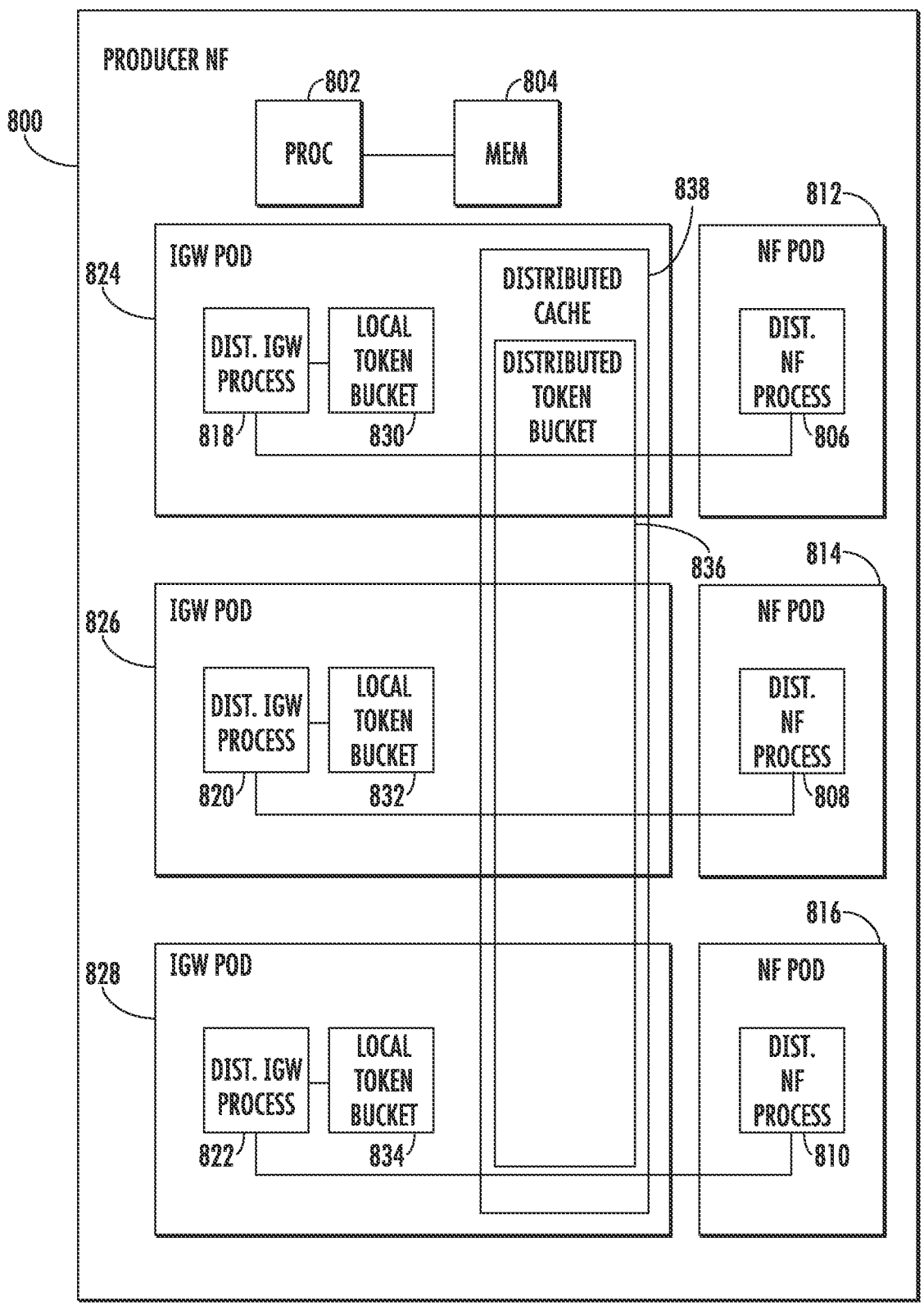
FIG. 8 is a block diagram illustrating an exemplary architecture for a producer NF that uses local token buckets and a distributed token bucket to allow processing ingress messages.

FIG. 8 is a block diagram illustrating an exemplary architecture for a producer NF that uses local token buckets and a distributed token bucket to allow processing of ingress SBI request messages. Referring to FIG. 8, a producer NF 800 includes at least one processor 802 and a memory 804. Producer NF 800 further includes a plurality of distributed producer NF applications 806, 808, and 810 implemented in separate containers, pods, or virtual machines 812, 814, and 816. By "separate", it is meant that the containers, pods, or virtual machines 812, 814, and 816 are implemented using distinct units or partitions of virtualized computing resources. Producer NF 800 further includes distributed IGWs 818, 820, and 822 implemented in separate IGW pods 824, 826, and 828. Each distributed IGW 818, 820, and 822 has access to a local token bucket 830, 832, or 834. Distributed IGWs 818, 820, and 822 share access to a distributed token bucket 836 implemented using a distributed cache 838.

Distributed IGWs 818, 820, and 822 perform the process illustrated in FIG. 7 of determining whether sufficient tokens exist in the local token bucket and refilling the local token bucket from the distributed token bucket. Distributed producer NF applications 806, 808, and 810 collectively implement the functionality of a producer NF instance, which may be any of the NF instance types illustrated in FIG. 1, including SCPs or SEPPs. Distributed token bucket 836 may be replenished at a global refresh rate that is configured by the network operator based on a desired global message processing rate of producer NF 800. Distributed producer NF applications 806, 808, and 810 and distributed token bucket 836 may be implemented using computer executable instructions stored in memory 804 and executable by processor 802.

Figure 9:
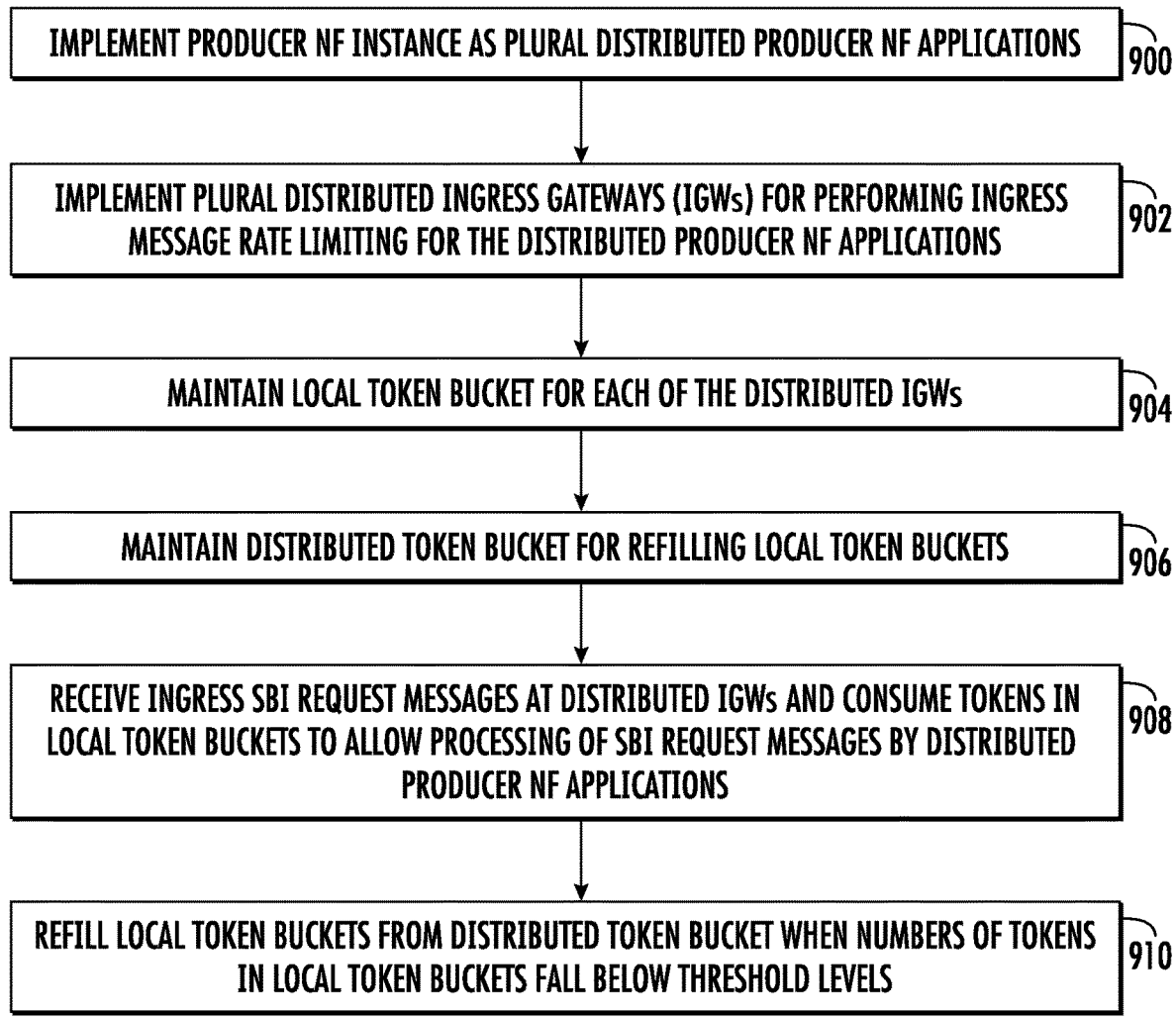
FIG. 9 is a flow chart illustrating an overall process for using an optimized token bucket algorithm to perform ingress message rate limiting at a producer NF instance implemented as a plurality of distributed producer NF applications.

FIG. 9 is a flow chart illustrating an overall process for using an optimized token bucket algorithm to perform ingress message rate limiting at a producer NF implemented as distributed producer NF applications. Referring to FIG. 9, in step 900, the process includes implementing a producer NF as a plurality of distributed producer NF applications. For example, a producer NF, such as producer NF 800, may be implemented using a plurality of producer NF applications implemented in separate containers, pods, or virtual machines, as illustrated in FIG. 8.

In step 902, the process includes implementing plural ingress gateways (IGWs) for performing ingress message rate limiting for the distributed producer NF applications. For example, distributed IGWs 818, 820, and 822 can be implemented components of producer NF instance 800 to perform the steps described herein for ingress message rate limiting of messages processed by distributed producer NF applications 806, 808, and 810. In one example, distributed IGWs 818, 820, and 822 may be implemented in separate pods from distributed producer NF applications 806, 808, and 810. In an alternate example, each distributed IGW 818, 820, and 822 may be implemented in the same pod as its respective distributed producer NF application 806, 808, or 810.

In step 904, the process includes maintaining, for each of the distributed IGWs, a local token bucket for rate limiting of ingress SBI request messages received by the IGW. For example, each distributed IGW may have a local token bucket that stores tokens to be consumed when ingress messages received by the distributed IGW are forwarded to the distributed producer NF application associated with the distributed IGW.

In step 906, the process includes maintaining a distributed token bucket for refilling the local token buckets. For example, a distributed token bucket may be implemented using a distributed cache that is accessible by plural distributed IGWs to refill their respective local token buckets. The tokens in the distributed token bucket may be shared equally or unequally among the distributed IGWs.

In step 908, the process includes receiving ingress SBI request messages at the distributed IGWs and consuming, by the distributed IGWs, tokens from the local token buckets to allow processing of the ingress SBI request messages by the distributed producer NF applications. For example, each distributed IGW may consume tokens from its local token bucket before attempting to refill its local token bucket from the distributed or shared token bucket.

In step 910, the process includes refilling the local token buckets with tokens from the distributed token bucket when numbers of tokens in the local token buckets fall below threshold levels. For example, each distributed IGW may access the distributed token bucket when the number of tokens in the local token bucket is insufficient to allow processing of one or more received SBI request messages. The threshold level that triggers a refill event may be set higher than the amount of tokens required to allow processing of single SBI request message to allow the local bucket to be refilled before the local token bucket contains insufficient tokens to allow processing of an SBI request message. The same or different thresholds may be set for the local token buckets to trigger the refill event.

Exemplary advantages of the subject matter described herein include reduced resource utilization of producer NFs and reduced latency in processing SBI request messages. In addition, the subject matter described herein can be implemented on any NF that operates as a service producer, including an SCP or an SEPP.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.1.0 (2022-12)
2. Token Bucket, https:/en.wikipedia.org/wiki/Token_bucket, Dec. 8, 2022

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for using an optimized token bucket algorithm for ingress message rate limiting across distributed producer network function (NF) applications, the method comprising:
   implementing a producer NF instance as a plurality of distributed producer NF applications;
   implementing a plurality of distributed ingress gateways (IGWs) as components of the producer NF instance for performing ingress message rate limiting for the distributed producer NF applications, wherein implementing the plurality of distributed IGWs includes implementing one of the distributed IGWs for each one of the distributed producer NF applications such that each of the distributed producer NF applications is associated with one of the distributed IGWs;
   maintaining, for each of the distributed IGWs, a local token bucket for rate limiting of ingress service-based interface (SBI) request messages received by each of the distributed IGWs;
   maintaining a distributed token bucket for refilling the local token buckets;
   receiving ingress SBI request messages at the distributed IGWs and consuming, by the distributed IGWs, tokens from the local token buckets to allow processing of the ingress SBI request messages by the distributed producer NF applications, wherein each of the distributed IGWs consumes tokens from its local token bucket for the ingress SBI request messages sent to the distributed NF application associated with the distributed IGW; and
   refilling the local token buckets with tokens from the distributed token bucket when numbers of tokens in the local token bucket fall below a threshold level.

2. The method of claim 1 wherein implementing the producer NF instance as a plurality of distributed producer NF applications and implementing the distributed IGWs includes implementing the distributed producer NF applications and the distributed IGWs using separate virtualized computing resources.

3. The method of claim 2 wherein implementing the distributed producer NF applications using the separate virtualized computing resources includes implementing the distributed producer NF applications using separate pods, docker containers, or virtual machines.

4. The method of claim 1 wherein maintaining a local token bucket for each of the distributed IGWs includes initializing the local token bucket for each of the distributed IGWs with an amount of tokens based on historical ingress SBI request message traffic at the distributed IGW.

5. The method of claim 1 wherein maintaining the distributed token bucket includes implementing the distributed token bucket using a distributed cache accessible by each of the distributed IGWs.

6. The method of claim 1 wherein receiving the SBI request messages and consuming tokens from the local token buckets includes, at one of the distributed IGWs:
   receiving an ingress SBI request message;
   determining whether the local token bucket accessible by the one distributed IGW has sufficient tokens to allow processing of the ingress SBI request message; and
   in response to determining that the local token bucket has sufficient tokens to allow processing of the ingress SBI request message, consuming at least one token from the local token bucket and forwarding the ingress SBI request message to one of the distributed producer NF applications for processing the ingress SBI request message.

7. The method of claim 6 wherein consuming at least one token from the local token bucket includes consuming the at least one token from the local token bucket without accessing the distributed token bucket.

8. The method of claim 6 wherein refilling the local token buckets from the distributed token bucket comprises:
   in response to determining that the local token bucket does not have sufficient tokens to allow processing of the ingress SBI request message, communicating, to the distributed token bucket, a request for tokens for refilling the local token bucket;
   determining whether the distributed token bucket has sufficient tokens to satisfy the request; and
   in response to determining that the distributed token bucket has sufficient tokens to satisfy the request, refilling the local token bucket with tokens from the distributed token bucket.

9. The method of claim 8 wherein consuming tokens from the local token buckets to allow processing of the ingress SBI request messages includes using the tokens in the local token bucket refilled from the distributed token bucket to allow processing of the ingress SBI request message received by the one distributed IGW.

10. The method of claim 8 comprising, in response to determining that the distributed token bucket does not have sufficient tokens to satisfy the request, discarding the ingress SBI request message.

11. A system for using an optimized token bucket algorithm for ingress message rate limiting across distributed producer network function (NF) applications, the system comprising:
   a producer NF instance including at least one processor and a memory;
   a plurality of distributed producer NF applications that implement the producer NF instance and a plurality of distributed ingress gateways (IGWs) implemented as components of the producer NF instance and using the at least one processor, the distributed IGWs each having access to one of a plurality of local token buckets for rate limiting of ingress service-based interface (SBI) request messages received by each of the distributed IGWs, wherein the plurality of distributed IGWs includes one of the distributed IGWs implemented for each one of the distributed producer NF applications such that each of the distributed producer NF applications is associated with one of the distributed IGWs; and a distributed token bucket for refilling the local token buckets, wherein the distributed IGWs are configured to receive ingress SBI request messages, consume tokens from the local token buckets to allow processing of the ingress SBI request messages by the distributed producer NF applications, and refill the local token buckets with tokens from the distributed token bucket when numbers of tokens in the local token bucket falls below a threshold level, wherein each of the distributed IGWs consumes tokens from its local token bucket for the ingress SBI request messages sent to the distributed producer NF application associated with the distributed IGW.

12. The system of claim 11 wherein the producer NF includes a plurality of separate virtualized computing resources and the distributed producer NF applications and IGWs are implemented in the separate virtualized computing resources.

13. The system of claim 12 wherein the separate virtualized computing resources include separate pods, docker containers, or virtual machines.

14. The system of claim 11 wherein the local token bucket for each of the distributed IGWs is initialized with an amount of tokens based on historical ingress SBI request message traffic at the distributed IGW.

15. The system of claim 11 wherein the producer NF instance includes a distributed cache accessible by each of the distributed IGWs and the distributed token bucket is implemented using the distributed cache.

16. The system of claim 11 wherein one of the distributed IGWs is configured to:

receive an ingress SBI request message;

determine whether the local token bucket accessible by the one distributed IGW has sufficient tokens to allow processing of the ingress SBI request message; and in response to determining that the local token bucket has sufficient tokens to allow processing of the ingress SBI request message, consume at least one token from the local token bucket and forward the ingress SBI request message to one of the distributed producer NF applications for processing.

17. The system of claim 16 wherein the one distributed IGW is configured to consume the at least one token from the local token bucket without accessing the distributed token bucket.

18. The system of claim 16 wherein the one distributed IGW is configured to refill the local token bucket from the distributed token bucket by:

in response to determining that the local token bucket does not have sufficient tokens to allow processing of the ingress SBI request message, communicating, to the distributed token bucket, a request for tokens for refilling the local token bucket;

determining whether the distributed token bucket has sufficient tokens to satisfy the request; and in response to determining that the distributed token bucket has sufficient tokens to satisfy the request, refilling the local token bucket with tokens from the distributed token bucket.

19. The system of claim 18 wherein the one distributed IGW is configured to use the tokens in the local token bucket refilled from the distributed token bucket to allow processing of the ingress SBI request message received by the one distributed IGW.

20. A non-transitory computer-readable medium having stored thereon executable instructions that when executed by a processor of a computer controls the computer to perform steps comprising:

implementing a producer network function (NF) instance as a plurality of distributed producer NF applications;

implementing a plurality of distributed ingress gateways (IGWs) as components of the producer NF instance for performing ingress message rate limiting for the distributed producer NF applications, wherein implementing the plurality of distributed IGWs includes implementing one of the distributed IGWs for each one of the distributed producer NF applications such that each of the distributed producer NF applications is associated with one of the distributed IGWs;

maintaining, for each of the distributed IGWs, a local token bucket for rate limiting of ingress service-based interface (SBI) request messages received by each of the distributed IGWs;

maintaining a distributed token bucket for refilling the local token buckets;

receiving ingress SBI request messages at the distributed IGWs and consuming, by the distributed IGWs, tokens from the local token buckets to allow processing of the ingress SBI request messages by the distributed producer NF applications, wherein each of the distributed IGWs consumes tokens from its local token bucket for the ingress SBI request messages sent to the distributed producer NF application associated with the distributed IGW; and refilling each of the local token buckets with tokens from the distributed token bucket when numbers of tokens in the local token buckets fall below a threshold level.

\* \* \* \* \*